US00RE35637E

United States Patent [19]

Lothmann et al.

[11] E Patent Number: Re. 35,637

[45] Reissued Date of Patent: Oct. 21, 1997

[54] CLOSING APPARATUS FOR THE BOTTOM POURING HOLE OF A CASTING LADLE

[75] Inventors: Josef Lothmann, Langerwehe; Jürgen Osborg-Schmitz, Hürtgenwald-Gey; Wolfgang Schönbrenner, Kreuzau, all of Germany

[73] Assignee: Zimmerman & Jansen, Duren, Germany

[21] Appl. No.: 237,927

[22] Filed: May 4, 1994

Related U.S. Patent Documents

Reissue of:

[64] Patent No.: 5,110,018
Issued: May 5, 1992
Appl. No.: 661,421
Filed: Feb. 26, 1991

[30] Foreign Application Priority Data

Feb. 26, 1990 [DE] Germany ..... 40 06 064

[51] Int. Cl.[6] ..... B22D 41/34

[52] U.S. Cl. ..... 222/600; 266/236

[58] Field of Search ..... 266/236; 222/591, 222/597, 600

[56] References Cited

U.S. PATENT DOCUMENTS 3,613,965 10/1971 Shapland ..... 222/600
4,116,372 9/1978 Horiguchi et al. ..... 222/600
4,233,718 11/1980 Horiguchi et al. ..... 29/157
4,591,080 5/1986 Yoshihara ..... 222/600

FOREIGN PATENT DOCUMENTS 1928400 1/1974 Germany .
2704599 10/1979 Germany .
2652732 1/1986 Germany .

*Primary Examiner*—Scott Kastler
*Attorney, Agent, or Firm*—Armstrong, Westerman, Hattori, McLeland & Naughton

[57] ABSTRACT

A closing apparatus for the bottom pouring hole of a casting ladle, comprising a mounting plate mounted on the bottom of the ladle with a head plate resting against it, in which head plate a port is formed to pour out the melt, and further comprising a slide plate supported for pivoting movement about two axes and adapted to be pressed resiliently against the head plate. The slide plate is supported for reciprocating movement inside a housing. The housing is supported by a housing carrier structure, especially between the legs of carrier bracket for the housing, for pivoting movement about a first pivot axis, while the carrier bracket for the housing is supported by the mounting plate for pivoting about a second pivot axis. The first and second pivot axes extend parallel to each other and to the sealing face between the head and slide plates.

51 Claims, 7 Drawing Sheets

CLOSING APPARATUS FOR THE BOTTOM POURING HOLE OF A CASTING LADLE

Matter enclosed in heavy brackets [ ] appears in the original patent but forms no part of this reissue specification; matter printed in italics indicates the additions made by reissue.

FIELD OF INVENTION

The instant invention relates to a closing apparatus for the bottom pouring hole of a casting ladle.

PRIOR ART

A closing apparatus of that kind is known, for example, from the German Patent DE-A-26 52 732. There the *frame mounting the* slide plate is fixedly clamped, however, relative to the *frame mounting the* head plate [and within the slidable metal frame in the closing position] by two diametrically acting hook means. [Instead of] *In cooperation with* the aforementioned hooks hydraulically operable closing cylinders are proposed as well. These closing cylinders are provided to set an optimum sealing pressure between the [closing] *slide* and head plates, specifically in a way that the sealing operation is not substantially influenced by wear or deformation of the refractory plates. An automatic alignment of the slide plate relative to the head plate is not achieved in this configuration. Moreover, that structure is characterized by a comparatively high structural expenditure.

The aforementioned hook means allow all the less for an alignment of the slide plate relative to the head plate, with the result that due to soiling or uneven wear both the slide plate and the head plate are subjected to nonuniform loads with the consequence of a correspondingly inhomogenous wear of the slide and head plates.

Closing apparatus of that kind are also known, for example from DE-B-19 28 400. The known design is characterized in that the slide plate is supported at the bifurcated free end of a double link, pivotably supported at the bottom of the ladle, such that it is movable universally with respect to the sealing face, with one of the Cardanic axes coinciding with the double link axis located at the bifurcated end and extending in horizontal direction, and the second Cardanic axis being defined by the vertical pivot axis of the slide member. This Cardanic suspension permits the slide plate to carry out pivoting motions about two axes at right angles to each other.

That is intended to assure a more uniform pressure loading of all points of engagement of the slide plate with the sealing surface of the pouring ladle. The forced parallelism between the slide plate and the sealing face and the uniform pressure loading of the [selaing] *sealing* face, moreover, make sure that the cooperating surfaces are sealed reliably and worn uniformly in the opening and closing of the stopper. The design according to DE-B-19 28 400, however, is such that the above mentioned double link itself is not pivotable about a horizontal axis and consequently the mounting and demounting of the slide plate is rather expensive. Quick opening of the slide plate for the above mentioned purpose is not possible. In this respect there is not a hint of any appropriate measure and, of course, that is due also to the fact that actually the known design relates to a kind of rotary slide type closure.

It is known from DE-B-27 04 599 to provide a pivotable kind of support for the slide plate, including the respective frame and housing, at the mounting plate which is mounted on the bottom of the ladle so as to permit the assembly and disassembly of the slide plate. With this kind of embodiment, however, the parallel alignment of the slide and head plates with respect to each other presents a design problem which was solved by the toggle joint structure shown in FIG. 1 of DE-B-27 04 599. That structure still is being used successfully in practice. Yet the known toggle joint structure is extremely expensive and also rather complicated to handle.

SUMMARY OF THE INVENTION

It is the object of the invention, starting from the state of the art recited, to provide a slide member closing apparatus which is both easy to open and close and also guarantees automatic alignment of the slide plate so that uniform pressure will be exerted on the sealing face, thereby establishing a reliable seal and uniform wear of the interacting surfaces of the slide and head plates.

The double pivot support of the slide plate permits the slide type closure member to be opened and closed like a door or window. At the same time it is assured that any deviations from the parallel alignment between the slide and head plates are excluded. The forced parallelism of the slide and head plates warrants that the pressure loading of the sealing faces will be uniform so that a reliable seal is obtained and the cooperating surfaces of the slide and head plates become worn uniformly by the opening and closing of the closure.

The pivot axes are of particular significance according to which the pivot axes of the slide plate housing and of the housing carrier structure each extend parallel to the [adjusting] direction *of operating movement* of the slide plate. With this embodiment the slide member is pivotable about a longitudinal edge which is much longer than the cross edge so that not too much space is required for opening the gate-type closure.

Likewise particularly interesting is the closing means which provides for an hydraulically or hydropneumatically operable piston and cylinder unit to close the apparatus. This unit is adapted to move the slide plate into operating position, overcoming a predetermined sealing bias between the slide and head plates. Once in this position, the slide plate is held by a retainer hook or the like. The piston and cylinder unit mentioned thus presses the slide plate against the head plate under slightly increased pressure, doing so against the effect of the contact pressure springs which act on the slide plate and [determine] *establish* the sealing bias between the slide and head plates, whereby the mechanical locking by the retainer hook mentioned becomes possible. Following this mechanical locking, the piston and cylinder unit is removed again, if desired, by simply swinging it into an inoperative position. The piston and cylinder unit mentioned above, preferably, is coupled to a device for measuring and/or adjusting the pressure so as to determine and/or set the closing and opening pressure. That makes it possible, at the same time, to determine any excessive wear at the slide plate and/or the head plate. Furthermore, the device in question makes it possible to find out whether, upon repair, slide plates have been ground down too thin, whether the closing mechanism is worn out, whether the slide plate springs are [defect] *defective*, the spring cages positioned too low, or a similar defect exists, all of which would affect the contact pressure required for the slide plate.

Finally, special reference should be made to the piston and cylinder unit, the axis of which lies in a plane parallel to the sealing face between the slide plate and the head plate for which protection is claimed also independently of the above mentioned design, distinguishing this embodiment from the structure disclosed in DE-A-26 03 003. This known structure requires a lot [force] *of effort* to handle because the rather great weight of the piston and cylinder unit associated with the slide plate makes it difficult to suspend it from the corresponding holding lugs and couple it to the slide plate or to an intermediate piece joined with the same. All that is needed to [remedies] *remedy* or ease the situation is to put down the piston and cylinder unit with its two diametrically disposed radial pins on the two associated ramps and then push it over the ramps into corresponding recesses. That can be accomplished by a single person, whereas the known structure always requires two people, one to hold the piston and cylinder unit and another one to insert the radial bolts or pins into the respective pivot recesses.

BRIEF DESCRIPTION OF THE DRAWINGS

The invention will be described further, by way of example, with reference to the accompanying drawings, in which:

FIG. 1 illustrates a closing apparatus for the bottom pouring hole of a casting ladle. It comprises a mounting plate 10 secured to the bottom of the ladle and a head plate 13 which rests from below against the mounting plate, as indicated by discontinuous lines in FIG. 1, and in which a port 11 is formed through which the metal melt is poured out. In operative position, a slide plate 12 abuts against the lower side of the head plate 13, the slide plate likewise being formed with a port 14 for passage of the melt. The slide plate 12 which likewise is shown only by discontinuous lines in FIG. 1 is inserted in a frame 15 arranged in a housing 16 so as to be movable back and forth in a plane perpendicular to the central axis of the melt outlet ports 11 and 14, respectively. A plurality of contact pressure springs, not shown specifically in FIG. 1, are arranged in per se known manner between the frame 15 and the slide plate 12. At their lower ends they rest on the frame 15, and they exert pressure on the slide plate 12 in *an* upward direction or toward the head plate 13. The slide plate 12, together with the frame 15 and the housing 16, is supported for pivoting motion about a first pivot axis 18 between the two legs of a U-shaped carrier bracket 17 for the housing (see double arrow 19 in FIG. 1). The carrier bracket 17 in turn is supported at the mounting plate 10 for pivoting motion about a second pivot axis 20 which extends through the two ends of the legs of the carrier bracket. As may be seen in FIG. 1, the first and second pivot axes 18 and 20 extend parallel to each other and to the mounting plate 10 or sealing face between the head and slide plates. The double pivot axis type of support of the slide plate described and illustrated in detail in FIG. 1 excludes deviations from the parallel alignment of the corresponding surfaces of the head and slide plates in operative position, i.e. when the casting ladle is closed. In closing the apparatus, the slide plate 12 adjusts itself in parallel with the head plate, doing so automatically. As a result, the above mentioned tensioning springs exert uniform pressure on the slide plate 12. Accordingly, a permanent, reliable seal is obtained between the slide plate and the head plate. And the wear of the corresponding surfaces of slide and head plates is uniform and thus the optimum.

In the embodiment shown, the pivot axes 18, 20 each extend approximately parallel to the direction of displacement of the slide plate 12. Preferably the first pivot axis 18 is approximately aligned with the longitudinal central axis of the slide running in the direction of displacement of the slide plate 12.

Figure 4:
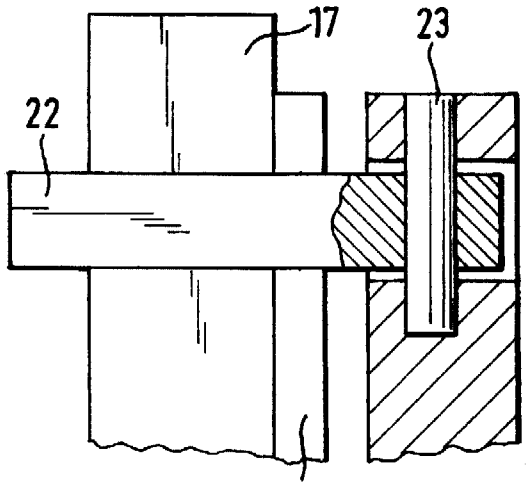
FIG. 4 is a lateral view, in the direction of arrow "A", of the locking showin in FIG. 3.
Figure 3:
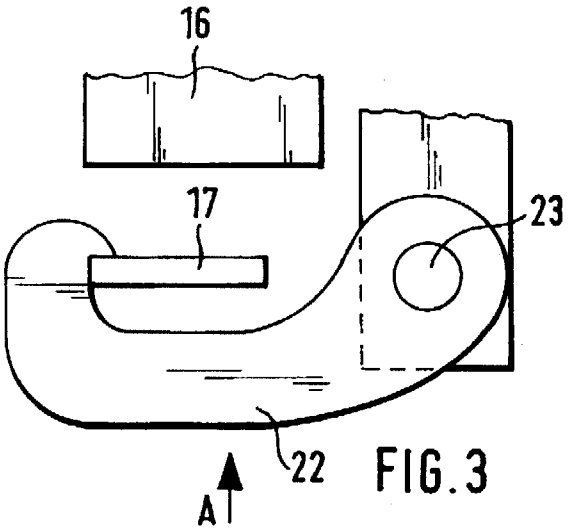
FIG. 3 is a top plan view of the locking of the closing apparatus shown in FIG. 1.
Figure 2:
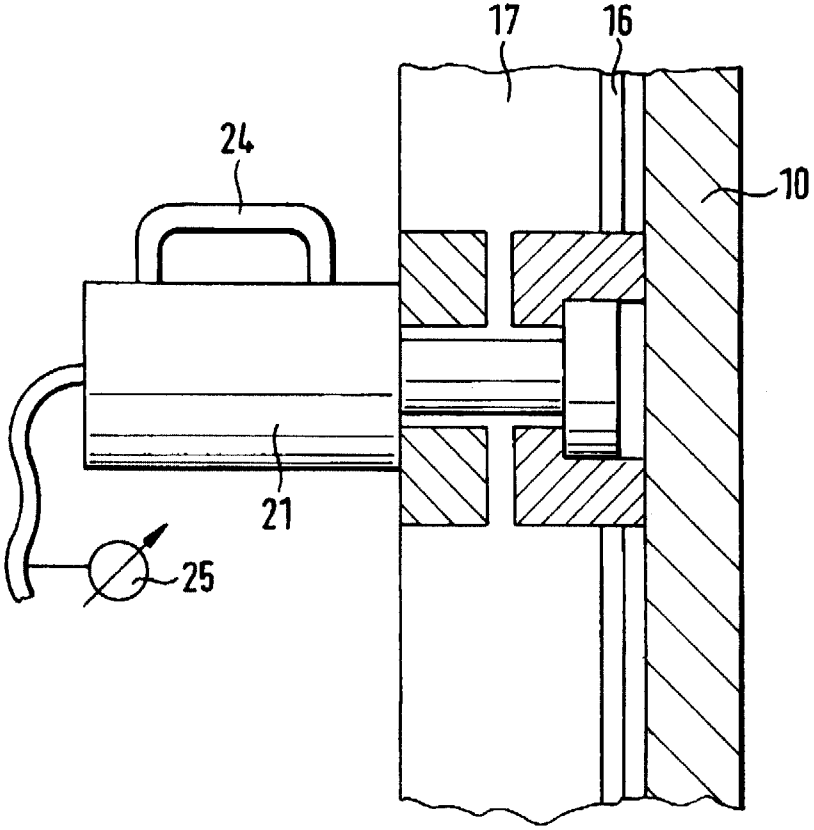
FIG. 2 is a diagrammatic cross sectional view of a closing aid of the apparatus.

The slide plate 12, including the frame 15 is adapted to be moved into operative position by a closing means in the form of an hydraulically or hydropenumatically operable piston and cylinder unit 21 (cf. FIG. 2) engaging the pivotably supported carrier bracket 17, on the one hand, and the mounting plate 10, on the other hand, while overcoming the above mentioned sealing bias between the slide plate and the head plate caused by contact pressure springs which are disposed between the slide plate and the plate frame. Once in the operative position mentioned, the slide plate is retained by a retainer hook 22 pivotably supported at the mounting plate 10, as shown in FIGS. 3 and 4. Preferably, there are two retainer hooks 22, one at either side of the closing means 21, the pivot axes of the retainer hooks likewise extending parallel to the two above mentioned pivot axes 18, 20. In FIGS. 3 and 4 the pivot axis of the retainer hook 2 is marked by reference numeral 23. The closing means or piston and cylinder unit 21 presses the slide plate against the head plate, counteracting the associated biasing springs and pressing the slide plate until the retainer hooks 22 can become engaged behind the carrier bracket 17, as shown in FIG. 3. Subsequently, the piston and cylinder unit 21 is released and removed [again]. Thus the piston and cylinder unit 21 merely serves for closing and also for opening of the apparatus specified, such as for purposes of assembling or disassembling or for exchanging the slide plate and/or the head plate. To this end, the casting ladle is moved into a position in which the pivot axes 18, 20 are approximately vertical. In this manner only little space is needed for opening the slide assembly. The carrier bracket 17, including the housing 16 and the slide plate 12, is opened like a relatively narrow door.

The closing means 21 described above which is provided with a handle 24 also can be coupled with a pressure measuring and/or adjusting device to determine and/or adjust the closing or opening pressure. The device mentioned is indicated by reference numeral 25 in FIG. 2. It can be determined by this device whether or not the contact pressure between the slide and head plates still is sufficient. Furthermore, it can be determined whether or not the springs are [defect] *defective* that bias the slide plate into operating position. When inserting a repaired slide plate, the pressure measuring and/or adjusting device 25 also may be used to determine whether the slide plates were ground too thin during repair so that sufficient contact pressure between the slide plate and the head plate is not warranted in operation. Furthermore, it can be found out in this manner whether the slide mechanism is worn out or the biasing spring cages are seated too low. In this respect the closing means specified, together with the pressure measuring and/or adjusting device 25, presents an extremely useful aid.

The slide plate 12 is driven, i.e. moved back and forth in conventional manneri ,by an hydraulically operable piston and cylinder unit so as to adjust the desired degree of opening of the pouring port of the casting ladle. With the embodiment according to FIG. 1, the piston and cylinder unit is connected to a connecting cylinder 26 through which passes a tubular or rod-like intermediate piece 27 which is reciprocable together with the slide plate. The free end of the piston rod of the above mentioned piston and cylinder unit is coupled to this intermediate piece.

Figure 5:
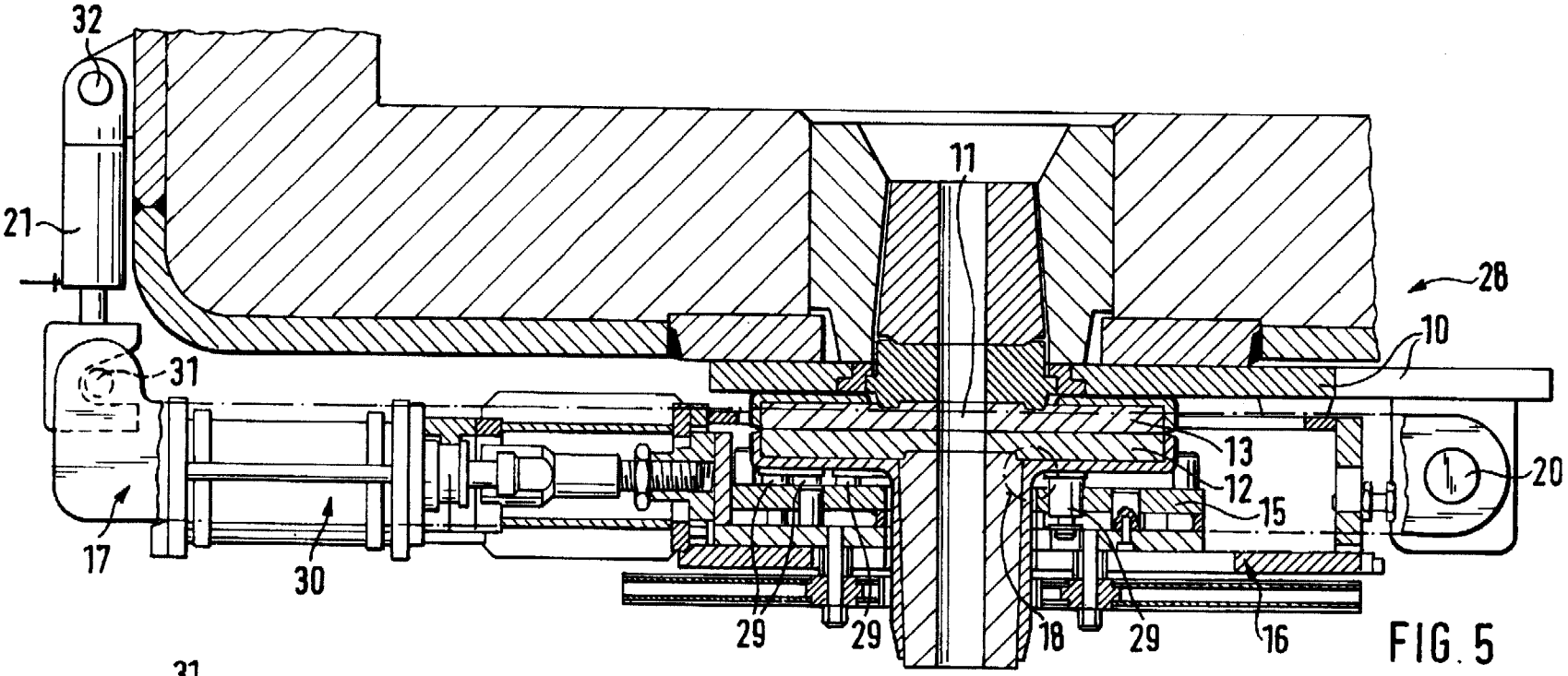
FIG. 5 is a view partly in section and partly in diagrammatic side elevation, of a modified embodiment of the closing apparatus according to the invention.
Figure 6:
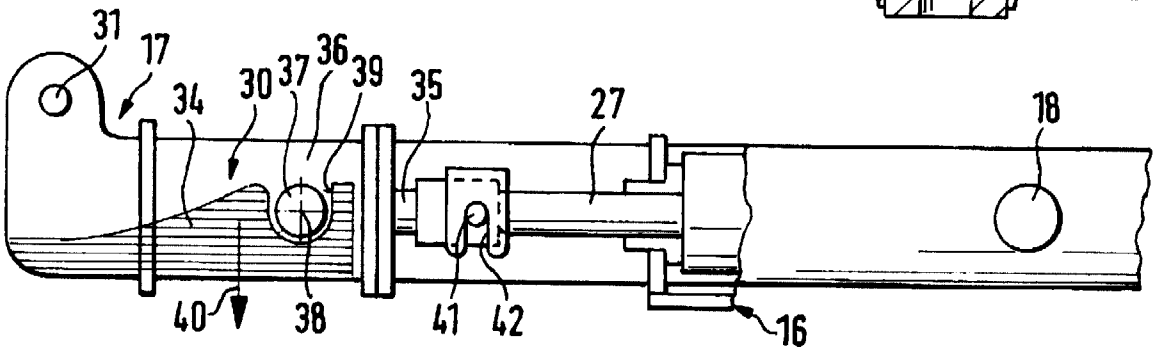
FIG. 6 is a diagrammatic side elevation of part of the apparatus shown in FIG. 5.
Figure 7:
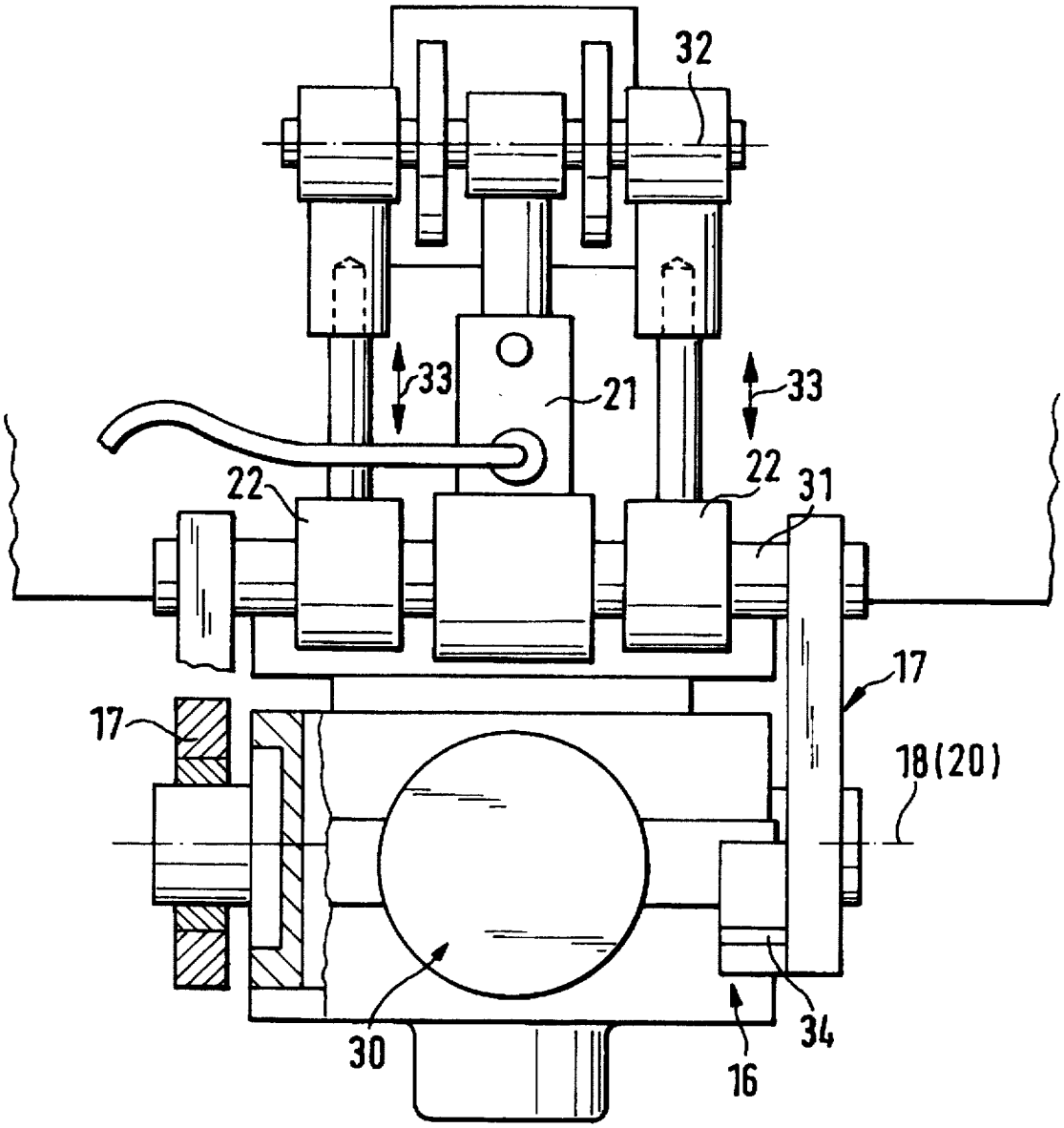
FIG. 7 is a rear view of the apparatus shown in FIGS. 5 and 6, showing the closing and biasing cylinder and the introducing ramps for the piston and cylinder unit coordinated with the slide plate.

FIGS. 5 to 7 show a modified embodiment of a closing apparatus according to the invention. With this apparatus, too, a mounting plate 10 is fixed to the bottom 28 of the casting ladle, and a head plate 13 rests against the mounting plate from below. The head plate has a port 11 for passage of the melt to be poured out. The slide plate 12 with its port 14 abuts against the lower side of the head plate 13. The slide plate 12 is inserted in a frame 15 arranged for displacement in a housing 16 from left to right and vice versa in FIG. 5. A plurality of contact pressure springs 29 are arranged between the frame 15 and the slide plate 12. At their lower ends, they rest on the frame 15, and they exert contact pressure in upward direction on the slide plate 12.

In a manner similar to that of the embodiment shown in FIGS. 1 to 4, the housing 16, including the slide plate 12 and the slide plate frame 15, is supported between the two legs of a carrier bracket 17 for the housing so as to be pivotable about a first pivot axis 18, while the carrier bracket 17 is supported for pivoting motion about a second pivot axis 20. The first and second pivot axes extend in parallel with each other and also parallel to the mounting plate 10 or sealing face between the slide and head plates. In this embodiment, the pivot axes 18, 20 further each extend [vertically] *perpendicularly* with respect to the direction of displacement for the slide plate as given by the drive means in the form of an hydraulically operable piston and cylinder unit 30 assciated with the slide plate. The opening and closing of the apparatus specified is effected, in the case of this embodiment, by an hydraulically or hydropneumatically operable piston and cylinder unit 21. The piston rod of this unit can be hooked up at the [web] *crosspiece* 31 of the carrier bracket 17 for the housing. The [diametrical] *opposite* end of the piston and cylinder unit 21, i.e. the cylinder thereof is pivoted at the casting ladle (pivot bearing 32). Durable closing is realized in a manner similar to the embodiment described above, namely purely mechanically by retainer hooks 22 engaging the above mentioned [web] *crosspiece* 31 of the carrier bracket 17 for the housing, as shown in FIG. 7. The length of the retainer hooks 22 is adjustable, as indicated in FIG. 7 by the double arrows 33. In this manner the spring bias for the slide plate 12 in continuous operation position is adjustable. The retainer hooks 22 also are supported at the casting ladle for pivoting motion about the above mentioned pivot bearing axis 32 for the piston and cylinder unit 21, this being at the sidewall of the casting ladle facing the slide plate drive (see FIG. 5).

As already mentioned, the slide plate 21 is shifted by means of a piston and cylinder unit 30 the axis of which, in operative position, lies in a plane substantially parallel to the sealing face of the slide plate. Members of a coupling each are associated with the piston rod 35 and the movable slide portion or an intermediate piece 27 connected to the same, on the one hand, and the cylinder 36 and the carrier bracket 17, on the other hand, such that the coupling members of the connection between the movable slide portion and the piston rod 35 are moved into engagement by pivoting movement of the piston and cylinder unit 30 in a substantially vertical plane (being the plane of the drawing of FIGS. 5 and 6) and are held in engagement by a [tilting moment] *tendency of the unit to tilt* which is effective in the plane of the pivoting movement. To be able to carry out the pivoting movement mentioned of the piston and cylinder unit 30, the cylinder 36 comprises two diametrically positioned radial bolts 37 which, forming the pivot axis 38 of the pistion and cylinder unit 30, [correspond to] *cooperate with* two upwardly open and mutually aligned recesses 39 [at] *on* two spaced apart holding lugs or—as is the case here—[at] *on* the two legs of the carrier bracket 17 for the housing. It is particularly significant with the embodiment illustrated that the two recesses 39 each are part of a ramp 34, each ramp 34 preceding the respective recess 39. In the embodiment shown, the ramps 34 each are positioned at the inside of those ends which face the [web] *crosspiece* of both legs of the carrier bracket 17 for the housing. As shown in FIG. 6, the ramps each are slightly curved concavely, when looked at from the top, i.e. from the casting ladle. Moreover, the transition between each ramp 34 and the associated recess 39 is rounded so as to facilitate introducing the radial bolts 38 formed [at] *on* the cylinder 36 of the piston and cylinder unit 30 into the two recesses 39. To obtain the tilting moment described above, the center of gravity of the piston and cylinder unit 30 lies between the recesses 39 and the [web] *crosspiece* 31 of the carrier bracket 17 for the housing. The above mentioned coupling members consist of two diametrically disposed radial bolts 41 at the free end of the piston rod 35 of the piston and cylinder unit 30, on the one hand, and [corresponding ones] *a cooperating member* having downwardly open recesses 42 at the end of the intermediate piece 27 facing the pistion and cylinder unit 30, the intermediate piece being functionally connected with the slide plate 12. Both the radial bolts 37 at the cylinder 36 and the radial bolts 41 at the free end of the piston rod 38 of the piston and cylinder unit 30 all extend parallel to the sealing face between the slide and head plates, preferably at the level of the longitudinal central axis of the piston and cylinder unit 30, as may be taken from FIG. 6. The two pivot axes 18, 20 preferably also lie in the same plane.

The ramps 34 mentioned above facilitate the assembly and disassembly of the piston and cylinder unit 30 or the coupling and uncoupling of this unit to and from the movable slide portion or intermediate piece 27 which is linked to the slide portion. When the piston and cylinder unit 30 is uncoupled and pulled out of the recesses 39, it need not be feared that the piston and cylinder unit 30 might drop on the floor, not even if this job is done by a single person. The piston and cylinder unit 30 continues to be supported by the radial bolts 37 on both ramps 34. And vise versa, the two ramps 34 also facilitate the coupling. The piston and cylinder unit is placed with its two radial bolts 37 on the free ends of the ramps 34. Then the piston and cylinder unit 30 is pushed over the two ramps to the two recesses 39 at the inside ends of the ramps 34 until the radial bolts 37 disposed at the cylinder 36 of the piston and cylinder unit 30 come to rest in the recesses 39. Thereupon the piston rod 35 is coupled in conventional manner to the intermediate piece 27, such as specified for example in DE-A-26 03 003. The effective ramp surface need not necessarily be arched concavely; a rectilinear ramp surface can be used as well. Preferably however, the free end, the left end in FIG. 6, of the ramp surfaces each extends approximately parallel to the direction of movement of the slide or approximately parallel to the sealing face between the slide and head plates. That makes sure that the piston and cylinder unit 30 cannot accidentally slip off and fall down on the floor, posing a risk of injury to the operator, when it is being placed on the free ends of the ramps 34. To reduce that risk still further, it may be of advantage to form a small, upstanding projection at the free end of each ramp 34. The piston and cylinder unit 30 then must be lifted across them for mounting and demounting.

For easier assembly and disassembly of the piston and cylinder unit 30, futhermore the radial bolts 37 at the cylinder 36 may be embodied by runner rolls.

The ramps in question are advantageous also for conventional slide type closures. Those may be retrofit accordingly. Referring to the above mentioned DE-A-26 03 003, the ramps mentioned above would have to be formed at the inner sides of the holding lugs for the piston and cylinder unit. As an alternative, the holding lugs themselves could be designed like ramps.

Figure 1:
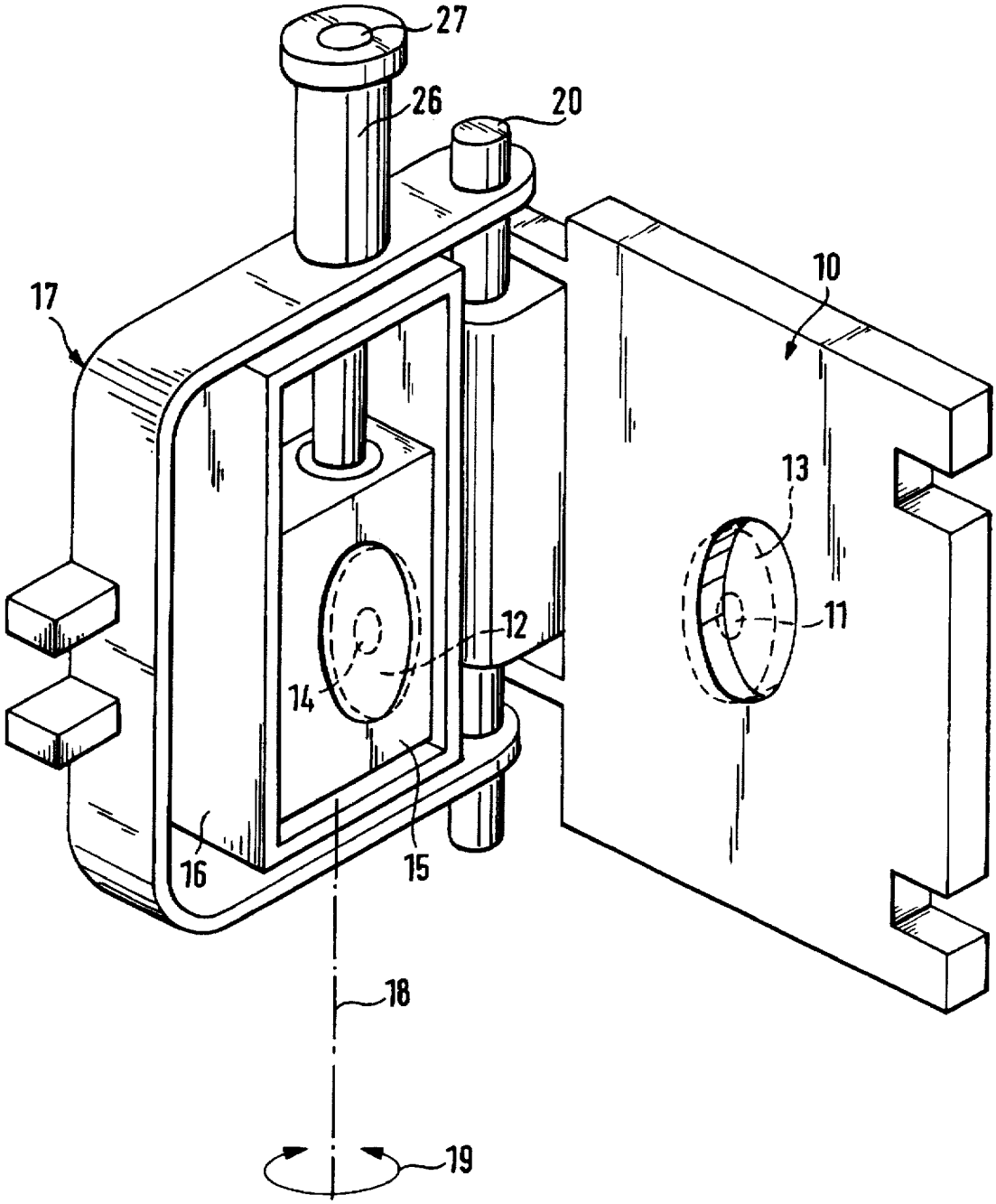
FIG. 1 is a diagrammatic perspective view of a closing apparatus designed according to the invention.
Figure 8:
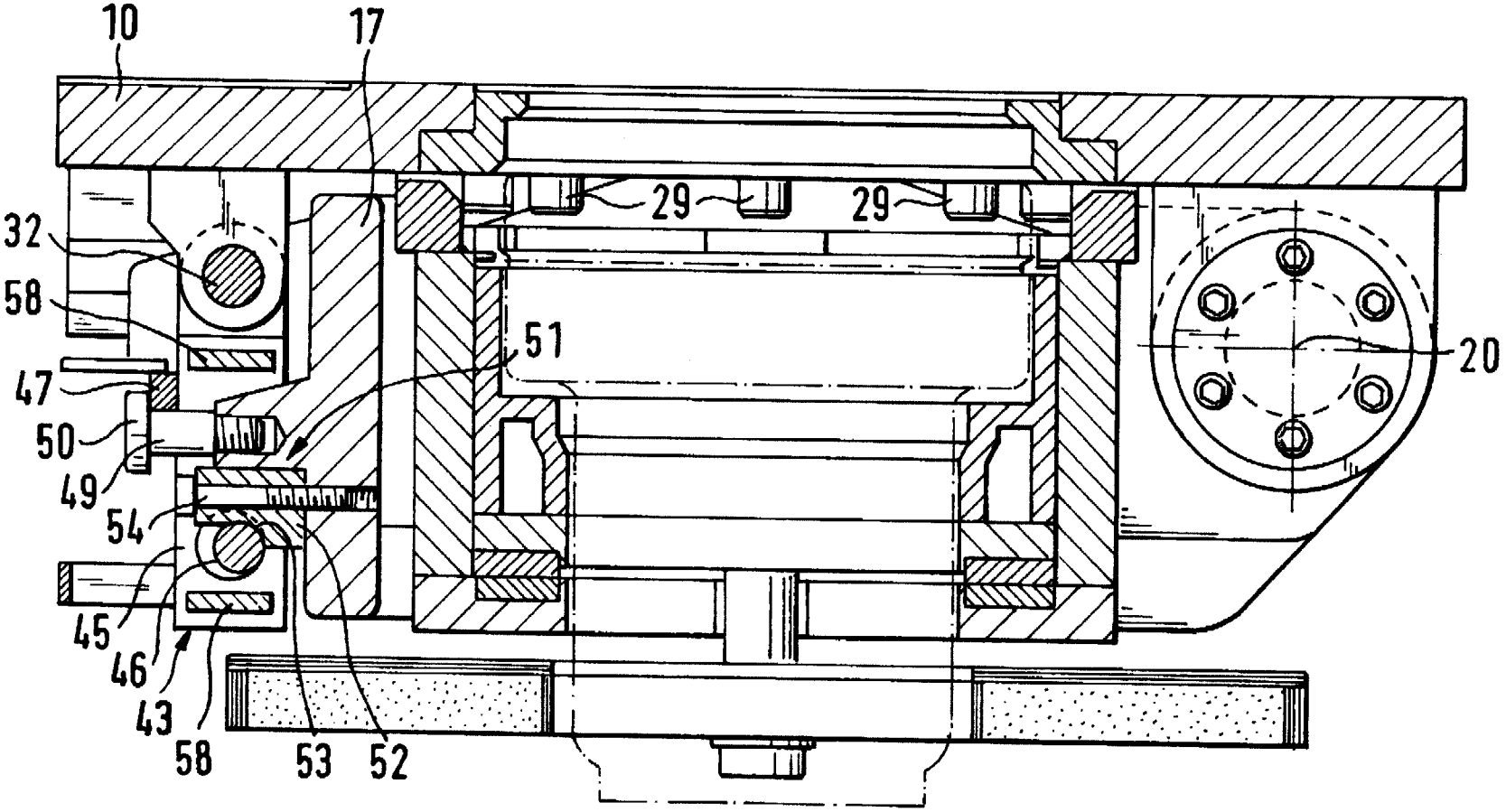
FIG. 8 is a detailed cross sectional view of a closing apparatus as shown in FIG. 1, presenting a preferred embodiment of a closing means.

FIG. 8 is a detailed cross sectional view of the closing apparatus according to FIG. 1. Those parts already explained with reference to FIG. 1 are given the same reference numerals in FIG. 8. A preferred means for closing and retaining the carrier bracket 17 for the housing will now be explained with reference to FIG. 8 and FIGS. 9 and 10. The holding means in question is marked by reference numeral 43. It comprises two holding [lugs] *arms* 44, 45 which are [axially] spaced apart and pivotably supported at the mounting plate 10 (cf. especially FIGS. 9 and 10). Their free ends offer pivotable support to an eccentric 46 which extends transversely and, when in operative position, engages behind a nose 51 projecting from the carrier bracket 17 for the housing. Preferably, two spaced apart holding means 43 of the kind described are associated with the [longitudinal web] *crosspiece* of the carrier bracket 17 for the housing. The pivot axis of the holding lugs 44, 45 or holding means 43 is marked by reference numeral 32. Exchangeably mounted members 52 are associated with the respective noses 51 formed [at the longitudinal web] *on the crosspiece* of the carrier bracket 17 for the housing. Each member 52 has a support surface 53 for the eccentric 46. As shown in FIG. 8, the support surface 53 is adapted to the circular cylindrical peripheral surface of the [eccenter] *eccentric* and is arranged slightly deeper. Therefore, in closing the apparatus, the eccentric 46 becomes locked in the support surface 53 while overcoming bias caused by the contact pressure springs 29 which act on the slide plate 12. FIG. 8 shows the eccentric 46 in this position. The sealing bias between the slide plate and the head plate can be adjusted or readjusted by means of this eccentric 46. Such readjustment helps to compensate any possible wear within the slide. When there are two or more of the holding means 43 of the kind described above, it is a matter of course that the eccentrics 46 each must be in the same position in order to warrant uniform contact pressure of the slide plate across its full length and width.

The support member 52 mentioned above is fixed by screw bolts 54 to the longitudinal web of the carrier bracket 17 for the housing.

The two holding [lugs] *arms 44, 45* are interconnected rigidly according to FIG. 8 by diametrically disposed crossties 58.

Figure 9:
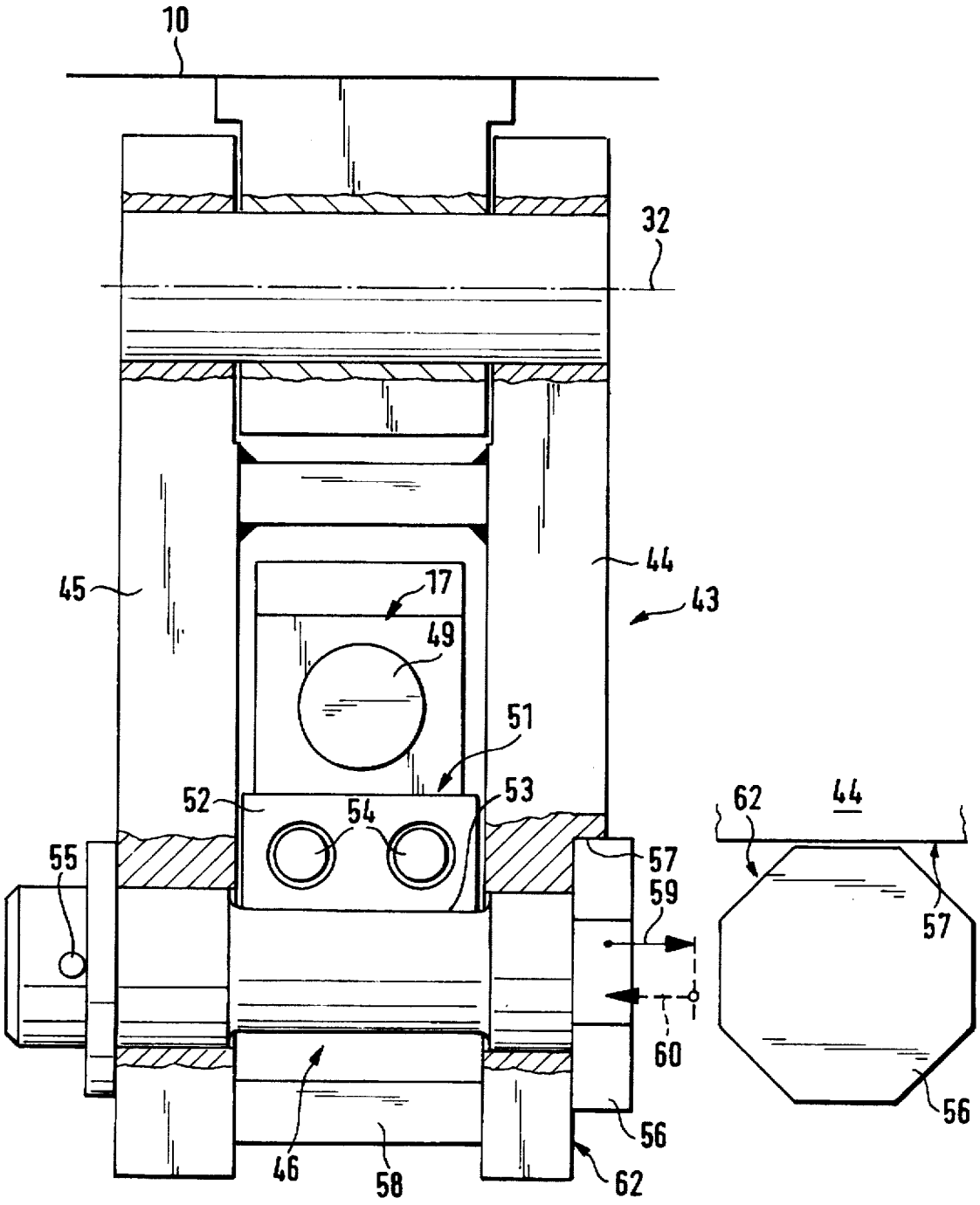
FIGS. 9 and 10 show the closing means of FIG. 8 on an enlarged scale in section and elevation, respectively.

According to FIG. 9, the rotably supported eccentric has an octogonal collar 56 at one end and a transverse split pin 55 at the opposite end. The split pin 55 first must be removed to be able to adjust or rotate the eccentric. Thereupon the eccentric can be displaced in the direction marked 59, i.e. to the right in FIG. 9, until the octogonal collar comes free of a complementary abutment surface 57 within a lateral recess 62 at the outside of the holding [lug] *arm* 44 associated with the collar 56. Subsequently, the eccentric 46 can be turned to the right or left, with corresponding positional change of the contact surface of the eccentric 46 which cooperates with the nose 51 or support surface 63 of the support member 52. Thereafter the eccentric 46 is pushed back in the direction of arrow 60 and secured in position by means of the split pin 55. The octogonal design of the collar 56 permits the eccentric to be fastened in eight different rotary positions.

Figure 10:
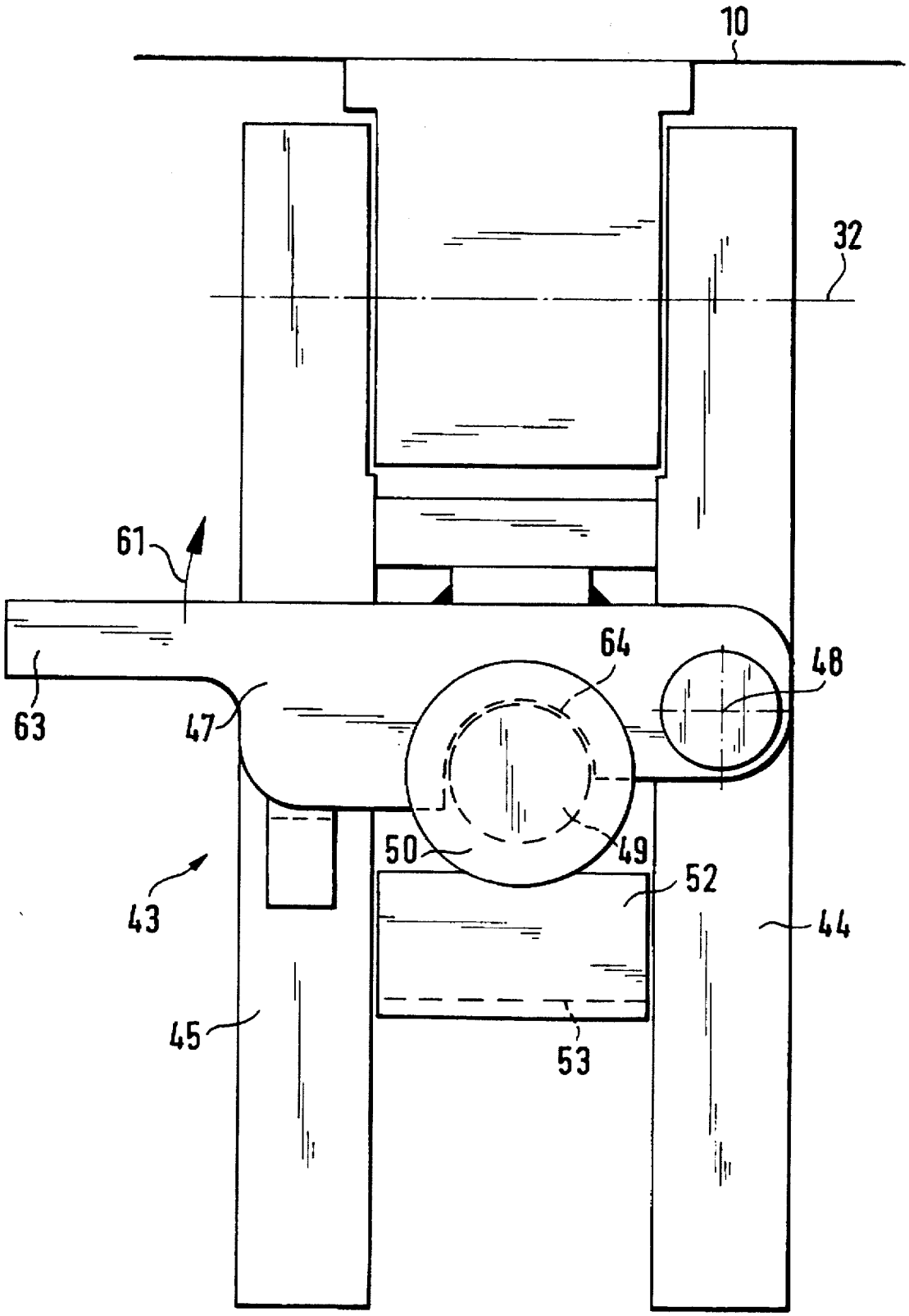

A safety catch is pivotably supported at the side of the holding [lugs] *arms* 44, 45 remote from the slide, this being at the holding [lug] *arm* 44 in the embodiment as shown in FIG. 10. The corresponding pivot support of the safety catch 47 is marked by reference numeral 48. In operating position, the safety catch 47 cooperates with a safety bolt 49 fixed to the carrier bracket 17 for the housing and passes between the two holding [lugs] *arms* 44,45 such that the holding means 43 specified cannot be pivoted into carrier bracket release position unless the safety catch 47 is raised. In the embodiment shown, the safety catch 49 is fastened at the free face end of the nose 51 and it has a radially projecting collar 50 at the free end.

When the apparatus is in operating position, i.e. closed, the safety catch 47 engages between the holding [lugs] *arms* 44,45, on the one hand, and the collar 50 of the safety bolt 49, on the other hand, as may be gathered both from FIGS. 8 and 10. The safety catch 47 is provided with a handle 63 at the end opposite the pivot bearing 48. The pivoting of the safety catch 47 into the position of release of the carrier bracket is indicated by arrow 61 in FIG. 10. The safety catch 47 reliably prevents any unintended opening of the closing apparatus. In the embodiment shown, the safety catch 47 has a recess 64 approximately of semicircular shape which corresponds to the upper half of the safety bolt 49.

All the features disclosed in the application documents are claimed as essential to the invention to the extent that they are novel in view of the state of the art, either individually or in combination.

What is claimed is:

1. A closing apparatus for a bottom pouring hole of a casting ladle, comprising a mounting plate mounted on the bottom of the ladle with a head plate resting against the mounting plate, in which head plate a port is formed to pour out melt, and further comprising a slide plate supported for pivoting movement about two axes and adapted to be pressed resiliently against the head plate, wherein the slide plate is supported for reciprocating movement inside a housing and the housing is supported by a housing carrier means, for pivoting movement about a first pivot axis, while the housing carrier means is supported by the mounting plate for pivoting about a second pivot axis, with the first and second pivot axes extending parallel to each other and to the sealing face between the head and slide plates, wherein said housing support means comprises a U-shaped carrier bracket[,] *carrying* said slide plate between the two legs of the carrier bracket, a frame which the slide plate [rest] *rests* against, and said housing for pivotal movement, defining said first pivot axis, with said carrier bracket being adapted to be moved into an operating position by a closing means engaging a [web] *crosspiece* at said bracket, on one hand, and said mounting plate, on the other hand, in which position said bracket is then retained by a retainer hook or similar mechanical holding means.

2. The apparatus as claimed in claim 1, wherein the slide plate has a direction of [adjustment] *displacement* and a center axis, and wherein the pivot axes each extend in parallel with the direction of [adjustment] *displacement* of the slide plate.

3. The apparatus as claimed in claim 2, wherein the first pivot axis is approximately aligned with the center axis of the slide plate extending parallel to the direction of [adjustment] *displacement* of the slide plate.

4. The aparatus as claimed in claim 1, wherein, the slide plate is adapted to be moved into operating position by the closing means, wherein the closing means can be an hydraulically or hydropneumatically operable piston and cylinder unit by means of which the carrier bracket can be moved into the operating position, while overcoming a sealing bias between the slide plate and the head plate caused by the slide plate being resiliently pressed against the [heat] *head* plate, the slide plate, when in operating position, being retained by the retainer hook or similar mechanical means.

5. The apparatus as claimed in claim 4, wherein the closing means is coupled to a pressure measuring or adjusting device to determine or adjust the closing or opening pressure.

6. The apparatus, as claimed in claim 1, comprising a piston and cylinder unit the axis of which, in operative position, lies in a plane substantially parallel to a sealing face between the slide plate and the head plate, with members of a respective coupling means each being associated with a piston rod and a movable slide portion or an intermediate piece connected to the same, on the one hand, and a cylinder and a fixed slide portion, on the other hand, so that the coupling members of the link between the piston rod and the movable slide portion are moved into engagement by pivoting motion of the piston and cylinder unit in a substantially vertical plane and are kept in engagement by a tilting moment effective in the plane of the pivoting motion, the cylinder comprising two diametrically arranged radial cylinder bolts which, forming the pivot axis of the piston and cylinder unit, correspond to two upwardly open and mutually aligned recesses at two spaced apart holding lugs for the piston and cylinder unit, wherein a mounting ramp each for the piston and cylinder unit is arranged upstream of the two recesses.

7. The apparatus as claimed in claim 6, wherein the mounting ramps each are curved slightly concavely as seen from the top, i.e. from the casting ladle, and in that the transition between the ramp and the associated recess is rounded.

8. The apparatus as claimed in claim 6 wherein the two holding lugs including the ramps are formed at the carrier bracket for the slide plate housing or the ramps are arranged at the two legs of the carrier bracket for the housing, specifically at the inner sides each, depending on the position of the first and second pivot axes.

9. The apparatus as claimed in claim 4 wherein the holding means comprises a setting means for adjusting or readjusting the sealing bias between the slide plate and the head plate.

10. The apparatus as claimed in claim 9 wherein the holding means is constituted by two holding [lugs] *arms* which are pivotably supported at the mounting plate and the free ends of which [pivotably] *rotatably* support an eccentric extending transversely and engaging [behind] a nose which is arranged to project from the carrier bracket for the housing, when the apparatus is in *its* operating position, wherein the eccentric [being] *is* the means for adjustment or readjustment of the sealing bias [beteen] *between* the slide and head plates.

11. The apparatus as claimed in claim 10, wherein a safety catch is pivotably supported at the holding means and, when in operative position, cooperates with a safety bolt which is fixed to the carrier bracket for the housing and extends between the two holding [lugs] *arms* so that the holding means cannot be swung into carrier bracket release position unless the safety catch is raised.

12. The apparatus as claimed in claim 11, wherein the safety bolt includes a radially projecting collar, and in that the safety catch engages between the holding [lugs] *arms* and the collar of the safety bolt when the apparatus is in operating position.

13. The apparatus as claimed in claim 10 wherein the projecting nose at the carrier bracket for the housing comprises an exchangeably mounted member having a support surface for the eccentric of the holding means.

14. The apparatus as claimed in claim 13, wherein the support surface is adapted to the circumferential surface of the eccentric and arranged slightly depressed so that, on closing of the apparatus, the eccentric will snap into engagement with the support surface, overcoming the bias caused by contact pressure springs which act on the slide plate.

*15. A closure valve apparatus for a pour opening of a bottom pour vessel, comprising:*

*a head plate fixedly secured with respect to said vessel, said head plate having a pour passage communicating with said vessel pour opening and a slide surface substantially perpendicular to the axis of said pour passage,*

*a slide plate containing a pour passage and a slide surface for sliding engagement with said head plate slide surface,*

*means for supporting said slide plate for automatically aligned, sliding surface-to-surface contact with said head plate, said means including:*

*a slide frame having said slide plate mounted therein,*

*a housing for guiding said slide frame for reciprocating movement with respect to said head plate,*

*means for moving said slide frame within said housing to displace said slide plate pour passage into and out of communication with said head plate pour passage,*

*a housing carrier,*

*means for connecting said housing to said housing carrier for pivotal movement about an axis substantially parallel to the slide surface of said slide plate; and*

*means for mounting said housing for pivotal movement with respect to said vessel bottom about a second axis between a closed position in which said plates are in sliding engaement with each other and an open position in which said plates are accessible; and*

*closing means for moving said housing carrier into said closed position and for maintaining it therein with respect to said vessel bottom.*

*16. The apparatus according to claim 15 in which said slide frame has a direction of movement substantially parallel to said first and second pivot axes.*

*17. The apparatus according to claim 15 in which said slide frame has a direction of movement substantially perpendicular to said first and second pivot axes.*

*18. The apparatus according to claim 16 in which said first pivot axis is substantially aligned with the longitudinal axis of said slide plate.*

*19. The apparatus according to claim 15 in which said housing carrier comprises a carrier bracket having oppositely spaced, substantially parallel legs, pivot means at one end of said legs for connecting said legs with respect to said vessel whereby said carrier bracket is pivotable about said second pivot axis, and pivot means extending between and interconnecting said housing and said legs whereby said housing is pivotable about said first pivot axis.*

*20. The apparatus according to claim 19 in which said carrier bracket includes a crosspiece extending between and interconnecting the other ends of said legs, and means on said crosspiece for operatively receiving said closing means.*

*21. The apparatus according to claim 20 including spring means for resiliently pressing said slide plate against said head plate for establishing the sealing bias therebetween, said closing means being operative to move said carrier bracket into said closed position against said sealing bias and for retaining it therein during operation of said valve apparatus.*

*22. The apparatus according to claim 21 in which said closing means comprises a fluidly operated piston-cylinder unit operable to move said carrier bracket into said closed position, and mechanical holding means for securing said carrier bracket in said closed position.*

*23. The apparatus according to claim 22 including means on one end of said piston-cylinder unit for grasping said crosspiece, and means for the other end thereof for pivotably connecting said unit to said vessel.*

*24. The apparatus according to claim 23 including a pressure measuring device coupled to said piston-cylinder unit for measuring the force to overcome said sealing bias.*

*25. The apparatus according to claim 22 in which said mechanical holding means comprises elongated hooks for connecting said carrier bracket with respect to said vessel.*

*26. The apparatus according to claim 25 including means for adjusting the length of said hooks.*

*27. The apparatus according to claim 24 in which said mechanical holding means comprise elongated hooks for connecting said carrier bracket with respect to said vessel, and means on said hooks for adjusting the length thereof in response to the pressure measured by said measuring device.*

*28. The apparatus according to claim 25 in which said hooks each include means at one end for grasping said carrier bracket, and means at the other end for pivotal connection of said hooks with respect to said vessel.*

*29. The apparatus according to claim 28 including a mounting plate secured to said vessel, means in said mounting plate for mounting said head plate in overlying relation to said vessel pour opening, and means on said mounting plate for pivotally connecting said hooks at said other ends thereof.*

*30. The apparatus according to claim 21 in which said closing means includes an eccentric member engageable with said carrier bracket, means for mounting said eccentric member for rotational movement for varying the engaging force between said eccentric member and said carrier bracket and means for removably engaging said eccentric member with respect to said carrier bracket.*

*31. The apparatus according to claim 30 in which said eccentric member-disposing means comprises a pair of oppositely spaced arms having one end of each thereof pivotally connected with respect to said vessel and the other end thereof journaling said eccentric member for rotation about an axis extending transversely of said arms.*

*32. The apparatus according to claim 31 including means for locking said eccentric member in a plurality of angularly displaced positions of rotation whereby the engaging force between said eccentric member and said carrier bracket is adjusted.*

*33. The apparatus according to claim 32 including a polygonally-shaped head formed on one end of said eccentric member, means forming a stop carried by said arms and cooperable with said head for holding said eccentric member in respective angularly displaced positions for maintaining the engaging force between said eccentric memeber and said carrier bracket.*

*34. The apparatus according to claim 31 including means forming a nose projecting from said carrier bracket for engagement with said eccentric member.*

*35. The apparatus according to claim 34 in which said nose includes a support member emgageable with said eccentric member and exchangeably attached to said carrier bracket for varying the deflection imparted to said carrier bracket by said eccentric member to adjust the sealing bias between said head and slide plates.*

*36. The apparatus according to claim 31 including means for releasably locking said eccentric member with respect to said carrier bracket, said means comprising a headed bolt attached to said carrier bracket to define a recess thereon, and a safety catch formed by a lever pivotally connected to one of said arms and removably disposable in said recess when said eccentric member is operably disposed to said carrier bracket.*

*37. A closure valve apparatus for a pour opening of a bottom pour vessel including a reciprocally displaceable slide plate having a sealing surface and a through-passage for controlling flow from said pour opening; a drive for said slide plate including a piston-and-cylinder unit disposed such that its centerline in the operating position is substantially parallel to said slide gate sealing surface; coupling means including members associated with a piston rod of said unit and an intermediate piece for operating said slide plate, respectively, said coupling members being disposed so as to become mutually engaged upon pivoting motion of the piston-and-cylinder unit in a plane substantially perpendicular to the plane of said sealing surface, a pair of oppositely disposed pivot pins extending from said cylinder unit, and a pair of oppositely spaced, upwardly open recesses in said valve apparatus for reception of said pins; and a mounting ramp disposed adjacent each of said recesses for guiding the movement of said pins into said recesses.*

*38. The apparatus according to claim 37 in which the upper surfaces of said ramps each contain an upwardly inclined, concave curvature adjacent to the associated recess.*

*39. The apparatus according to claim 37 in which said valve apparatus includes a housing for guiding the reciprocating movement of said slide plate, and a housing carrier securing said housing, and in which said recesses and said ramps are formed on lugs disposed on oppositely facing sides of said housing carrier.*

*40. The apparatus according to claim 38 including a convexly rounded transition portion disposed between each ramp and the associated recess.*

*41. The apparatus according to claim 39 including first pivot means for pivoting said housing carrier about a pivot axis transverse to the direction of movement of said slide gate, second pivot means on said housing for pivoting said housing with respect to said housing carrier, said first and second pivot means parallel to, and disposed on, the same plane as said oppositely extending pivot pins on said cylinder unit when operably disposed in said recesses.*

*42. The apparatus according to claim 41 including oppositely extending coupling pins on one of said coupling members, and coupling recesses for reception of said pins on*

*the other of said coupling members, said coupling pins, when received in said coupling recesses, being parallel to, and disposed in substantially the same plane as, said first and second pivot means.*

*43. The apparatus according to claim 37 including means forming an upstanding projection at the free end of each ramp.*

*44. The apparatus according to claim 37 in which said pivot pins extending from said cylinder unit are formed as rotatable rolls.*

*45. A closure valve apparatus for a pour opening of a bottom pour vessel, comprising* a head plate fixedly secured with respect to said vessel, said head plate having a pour passage communicating with said vessel pour opening and a slide surface substantially perpendicular to the axis of said pour passage,

*a slide plate containing a pour passage and a slide surface for sliding engagement with said head plate slide surface,*

*means for supporting said slide plate for sliding surface-to-surface contact with said head plate, said means including;*

*a slide frame having said slide plate mounted therein, means for imparting a sealing bias between said slide plate and said head plate,*

*a housing for guiding said slide frame for reciprocating movement with respect to said head plate,*

*means for moving said slide frame within said housing to displace said slide plate pour passage into and out of communication with said head plate pour passage,*

*means for mounting said housing for pivotal movement with respect to said vessel bottom between a closed position in which said plates are in sliding engagement with each other and an open position in which said plates are accessible, and*

*closing means for moving said housing into said closed position and for maintaining it therein with respect to said vessel bottom including;*

*a fluidly operated piston-cylinder unit releasably engageable with said housing and operable to move said housing into said closed position, and*

*holding means connectable with said housing and containing setting means for adjusting the sealing bias between said slide plate and the head plate.*

*46. The apparatus according to claim 45 in which said setting means comprises an eccentric member engageable with said housing, means for mounting said eccentric member for rotational movement for varying the engaging force between said eccentric member and said housing and means for removably engaging said eccentric member with respect to said housing.*

*47. The apparatus according to claim 46 in which said eccentric-mounting member comprises arm means having one end pivotally connected with respect to said vessel and the other end thereof containing means for journaling said eccentric member for rotation.*

*48. The apparatus according to claim 46 in which said eccentric includes a polygonally-shaped head formed on one end thereof, and means forming a stop carried by said arm means and cooperable with said head for holding said eccentric member in respective angularly disposed positions for adjustably maintaining the engaging force between said eccentric member and said housing.*

*49. The apparatus according to claim 47 including means forming a nose projecting from said housing for engagement with said eccentric member.*

*50. The apparatus according to claim 49 in which said nose includes an exchangeable support member carried by said housing and engageable with said eccentric member for varying the deflection imparted to said housing by said eccentric member to adjust the sealing bias between said head and slide plates.*

*51. The apparatus according to claim 47 including means for releasably locking said eccentric member with respect to said housing, said means comprising a body on said housing defining a recess, and a safety catch formed by a lever pivotally connected to side arm means and removably disposable in side recess when said eccentric member is operably disposed with respect to said housing.*

* * * * *